(12) United States Patent
Banks (10) Patent No.: US 9,924,799 B2
(45) Date of Patent: Mar. 27, 2018

(54) FOLDING FURNITURE (71) Applicant: ROCKPAPERROBOT INC., Brooklyn, NY (US)

(72) Inventor: Jessica Banks, Brooklyn, NY (US)

(73) Assignee: ROCKPAPERROBOT INC., Brooklyn, NY (US)

(*) Notice: Subject to any disclaimer, the term of this patent is extended or adjusted under 35 U.S.C. 154(b) by 73 days.

(21) Appl. No.: 15/156,255

(22) Filed: May 16, 2016

(65) Prior Publication Data

US 2016/0331140 A1 Nov. 17, 2016

Related U.S. Application Data

(60) Provisional application No. 62/162,733, filed on May 16, 2015.

(51) Int. Cl.
*A47C 4/00* (2006.01)
*F16F 9/02* (2006.01)
(Continued)

(52) U.S. Cl.
CPC .............. *A47C 4/00* (2013.01); *A47C 4/08* (2013.01); *A47C 4/18* (2013.01); *F16F 9/02* (2013.01); *A47B 3/002* (2013.01); *A47B 43/00* (2013.01)

(58) Field of Classification Search
CPC .... A47B 3/00; A47B 3/02; A47C 4/03; A47C 4/08; A47C 4/18; A47C 5/005;
(Continued)

(56) References Cited

U.S. PATENT DOCUMENTS 1,963,835 A * 6/1934 Deland .................. A47C 9/10
297/44
2,810,429 A * 10/1957 Lane ...................... A61G 5/08
297/44

(Continued)

FOREIGN PATENT DOCUMENTS

CN 201847191 6/2011
CN 203943356 11/2014
(Continued)

OTHER PUBLICATIONS

Translated International Search Report PCT/ISA/210, International Application No. PCT/US2016/032793, p. 1-8, International Filing Date May 16, 2016, dated Aug. 3, 2016.

*Primary Examiner* — Chi Q Nguyen
(74) *Attorney, Agent, or Firm* — Bond Schoeneck & King, PLLC; George McGuire (57) ABSTRACT

A folding chair comprising a framework, a deployment mechanism for fully retracting or expanding the frame, a seat and a back attached to the framework. The framework includes a back, a pair of opposing sides, each of which include a rear section and a front section that are hingedly connected to one another, a front section that extends between the front ends of the sides' front sections, and a seat that includes a front seat frame hingedly attached at its front edge to the interior surface of the front section, and a rear seat frame that is hingedly attached at its rear edge to the back. The seat's front and rear frames are also hingedly connected to each other along their adjacent edges. Retraction of the chair is achieved by a gas piston that is actuated by a string that the user can pull to create a fore that fully retracts the frame.

18 Claims, 10 Drawing Sheets

(51) Int. Cl.
*A47C 4/08* (2006.01)
*A47C 4/18* (2006.01)
*A47B 3/00* (2006.01)
*A47B 43/00* (2006.01)

(58) Field of Classification Search
CPC .... A47C 4/28; A47C 4/44; A47C 5/00; A47C 4/34; A47C 4/00
USPC .............................. 297/16.1, 21, 42, 440.12
See application file for complete search history.

(56) References Cited

U.S. PATENT DOCUMENTS

| | | | | |
|---|---|---|---|---|
| 4,245,849 | A * | 1/1981 | Thiboutot | A47C 4/286 248/436 |
| 2006/0186711 | A1 * | 8/2006 | Phipps | A47C 4/14 297/46 |
| 2010/0026057 | A1 * | 2/2010 | Miller | A47C 4/22 297/21 |
| 2012/0212018 | A1 * | 8/2012 | Ishikawa | A47C 1/0352 297/217.1 |
| 2013/0026799 | A1 * | 1/2013 | Miller | A47C 4/46 297/19 |

FOREIGN PATENT DOCUMENTS

| | | |
|---|---|---|
| DE | 20012511 | 12/2000 |
| GB | 262493 | 12/1926 |

\* cited by examiner

FOLDING FURNITURE

REFERENCE TO RELATED APPLICATION

The present application relates and claims priority to U.S. Provisional Patent Application Ser. No. 62/162,733, filed May 16, 2015, the entirety of which is hereby incorporated by reference.

BACKGROUND

1. Field of Invention

The present invention generally relates to folding furniture, and more specifically, chairs, barstools, and the like.

2. Background of Art

Folding chairs are familiar items. The traditional folding chair is defined by a rigid seat that is pivotally connected to a rigid back and legs that are also pivotally attached to the seat such that the seat and legs will fold relatively flat for easy storage.

Another common folding chair is composed of flexible fabric and used most typically as an outdoor seat. These outdoor folding chairs include four legs that butterfly from a central connecting point. The flexible fabric seat and back are connected to the legs and back posts that extend upwardly from the rear legs and simply collapse within the legs when the legs are brought together. The chair is typically stored in a bag when not in use to make carrying it easy, but it may be carried without storing in a bag.

The traditional and common folding chairs currently available rely on hinges that are external to the chair's actual structural support members and while functional, are neither aesthetically pleasing nor ergonomically comfortable.

3. Objects and Advantages

It is a principal object and advantage of the present invention to provide an ergonomic folding furniture piece, such as a chair, lounge, bench, and the like, that deploys to seating with flexible lumbar support.

It is another object and advantage of the present invention to provide a folding chair that may include a customizable/interchangeable seating surface that allows for various aesthetics, feels, and climates (e.g., indoor/outdoor).

It is a further object and advantage of the present invention to provide a folding chair that is lightweight and portable.

It is an additional object and advantage of the present invention to provide a folding chair that retracts to less than about two inches in width.

Other objects and advantages of the present invention will in part be obvious and in part appear hereinafter.

SUMMARY OF THE INVENTION

In accordance with the foregoing objects and advantages, the present invention provides a folding chair, barstool, or like furniture comprising a framework, a deployment mechanism for fully retracting or expanding the frame, a seat and a back attached to the framework. The framework comprises a back, a pair of opposing sides, each of which comprise a rear section and a front section that are hingedly connected to one another, a front section that extends between the front ends of the sides' front sections, and a seat/stretcher that includes a front seat/stretcher frame hingedly attached at its front edge to the interior surface of the front section, and a rear seat/stretcher frame that is hingedly attached at its rear edge to the back. The seat's front and rear frames are also hingedly connected to each other along their adjacent edges.

Deployment/partial retraction of the chair is achieved by a gas piston (or pair of gas pistons) that force the seat frame/stretchers apart. Retraction is achieved via actuation of a string and handle that the user can use to create a force that fully retracts the frame. Once retracted, the chair's planar panels all lie in substantially parallel planes to one another.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
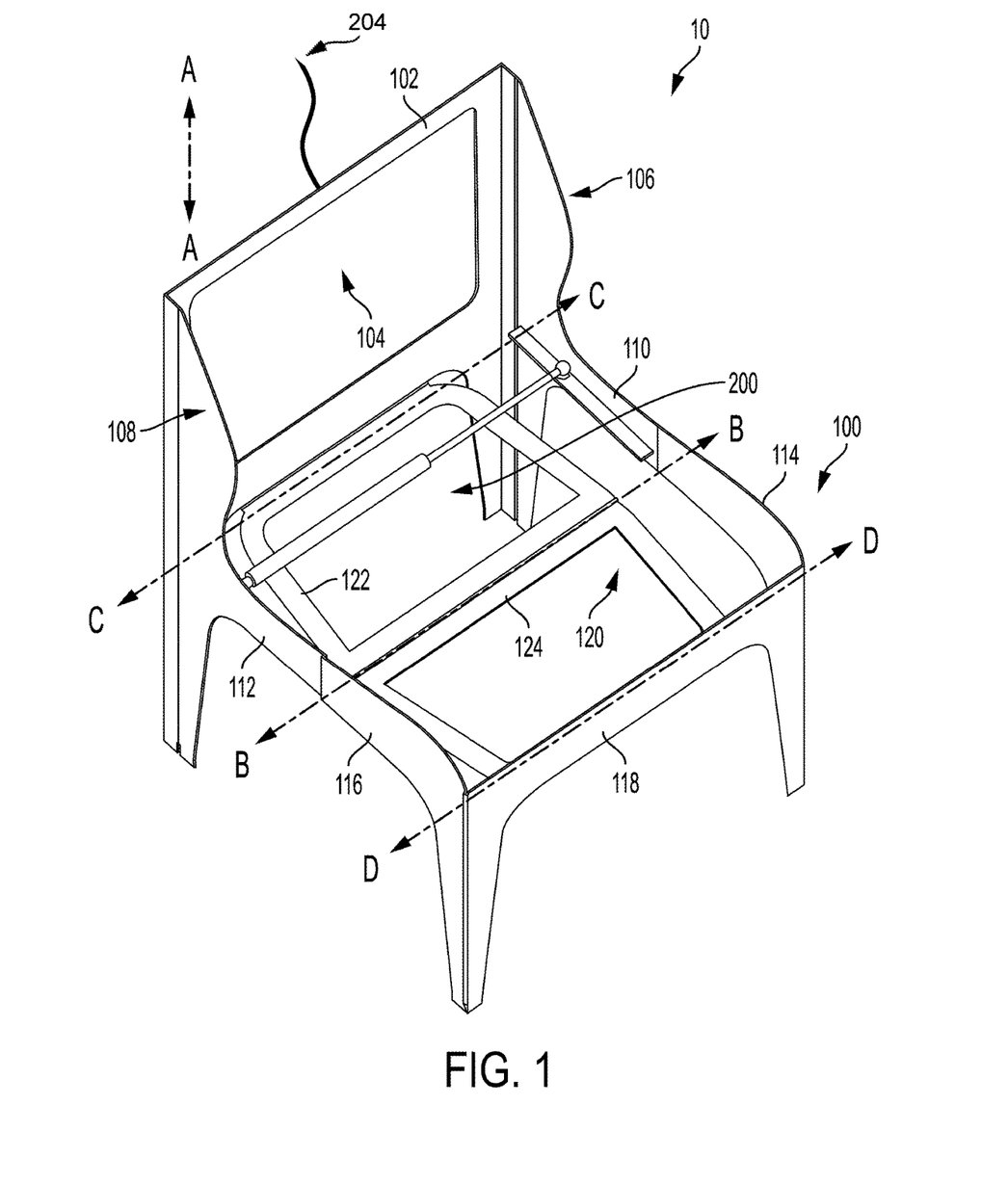
FIG. 1 is a perspective view of a folding chair in its fully open position accordance with a first embodiment of the present invention.
Figure 2:
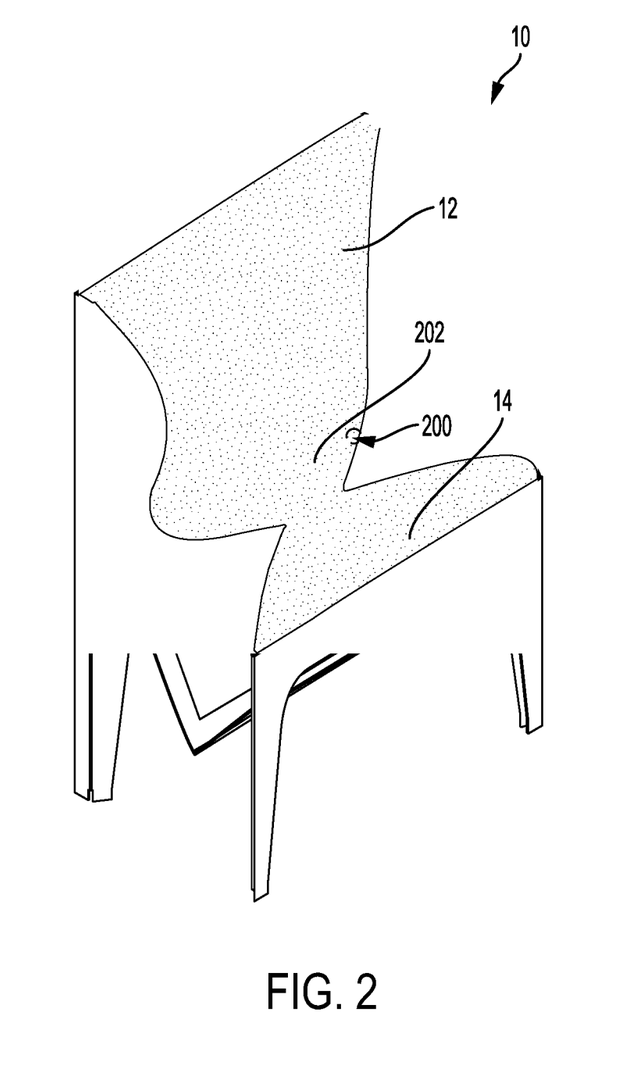
FIG. 2 is a perspective view of a folding chair in a partially open position accordance with an embodiment of the present invention.

Referring not to the drawings in which like reference numerals refer to like parts throughout, there is seen in FIG. 1 a folding chair, designated generally by reference numeral 10, generally comprising a frame, designated generally by reference numeral 100, a seat 12, a back 14, and a deployment mechanism, designated generally by reference numeral

200. A user may manipulate deployment mechanism 200 to assist in retraction of or deployment of chair 10, as will be described hereinafter. Although the preferred form of the invention is in the nature of a chair, the inventive aspects can extend to other furnishings, such as barstools, lounges, benches, for example.

Figure 3:
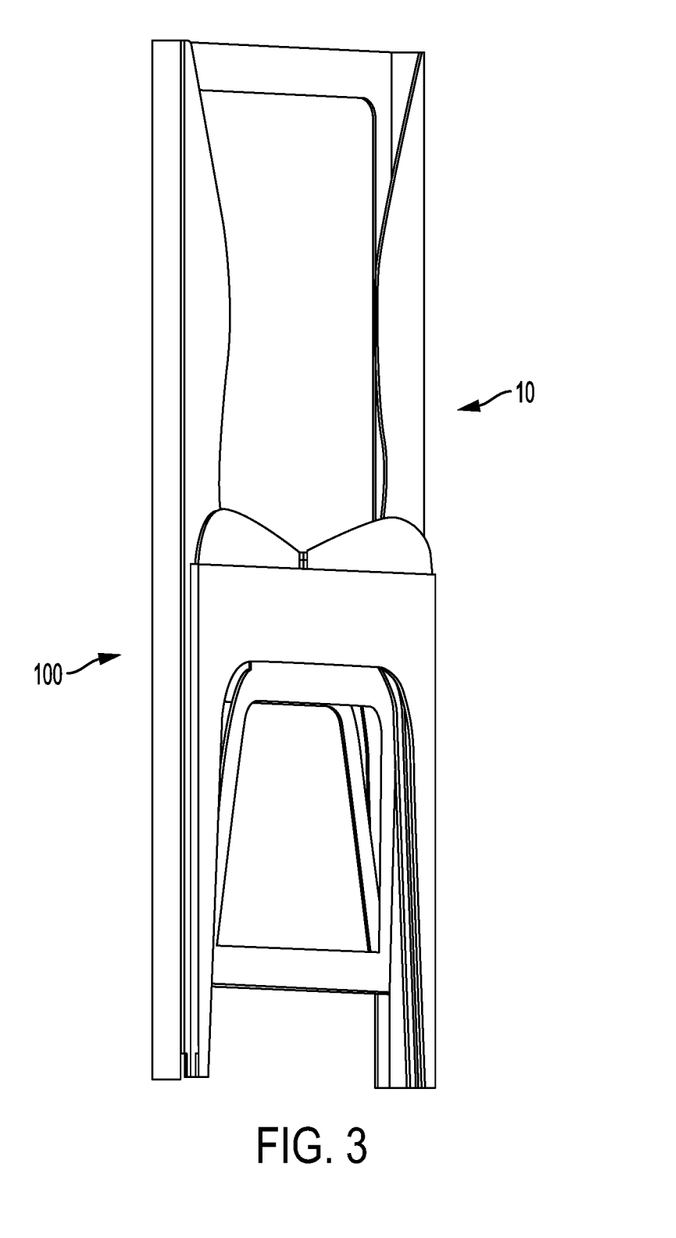
FIG. 3 is a perspective view of a folding chair in its fully closed position accordance with an embodiment of the present invention.

Frame 100 comprises several sectional pieces that are pivotally/hingedly arranged such that when in their retracted positions, chair 10 lies in a plane that is about 2 inches thick with all the planar panel pieces extending in substantially parallel planes to one another as illustrated in FIG. 3. A rigid back frame piece 102 includes in one embodiment, an open central section 104 (could be perforated instead of fully open for improved security of the seat/tambour while minimizing weight). A pair of side frames, designated generally by reference numerals 106 and 108, each includes a rear side frame 110, 112, respectively, and a front side frame 114, 116, respectively. Rear side frames 110, 112 are each pivotally/hingedly attached to back frame piece 102 along axes that are parallel to vertically extending axis A-A. Front side frames 114, 116 are pivotally/hingedly attached rear side frames 110, 112, respectively. A front frame piece 118 is pivotally/hingedly connected between the leading edges of front side frames 114, 116. A seat frame, designated generally by reference numeral 120, comprises a rear seat frame 122 pivotally/hingedly connected to a front seat frame 124 about an axis B-B that extends transverse to axis A-A. Rear seat frame 122 is pivotally/hingedly connected at its trailing edge to back frame piece 102 along an axis C-C that is parallel to axis B-B, and front seat frame 124 is pivotally/hingedly connected at its leading edge 102 along an axis D-D that is parallel to axis B-B.

Seat 12 and back 14 are preferably composed of a tambour that is draped over and attached to frame 100. The tambour provides a material that is flexible and permits the chair to be retracted or extended without the support surfaces impeding this function. In addition, the tambour is composed of pieces that have angled sides thereby permitting it to bend in both directions. The leading edge of the side pieces' rear frame piece 102 is ergonomically shaped such that a lumbar region 16 is formed in back 14 when the chair 10 is deployed. Variously designed tambours can be interchanged, and different materials can also be used to provide different feels for the surfaces as well as providing indoor or outdoor fabrics.

Deployment mechanism 200 comprises a gas piston/cylinder 202 and a string 204. Gas piston extends between the interior surfaces of rear side frames 110, 112 along an axis parallel to axis B-B. To retract chair 10, a user can pull string 204 which in turn actuates the gas piston 202 in a manner that retracts the chair 10 from its open position. To open chair 10, a user merely has to pull outwardly on the side frames 114, 116 which will cause the chair to open.

Figure 7:
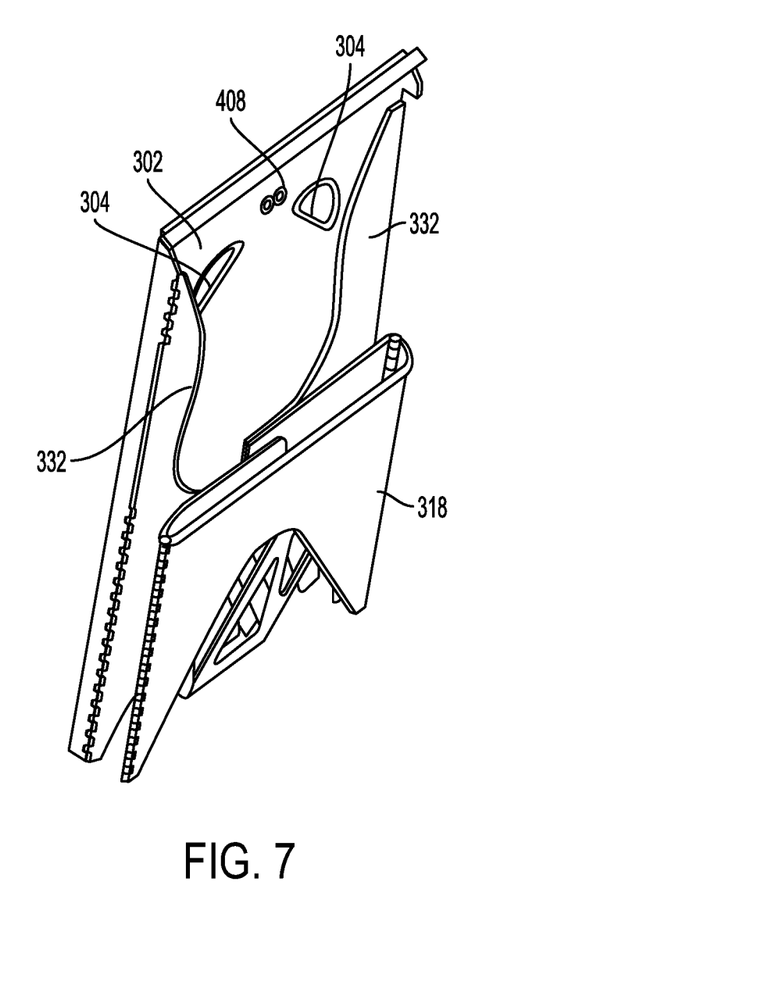
FIG. 7 is a perspective view of the frame for the folding chair of FIG. 4 in its fully retracted position.
Figure 8A:
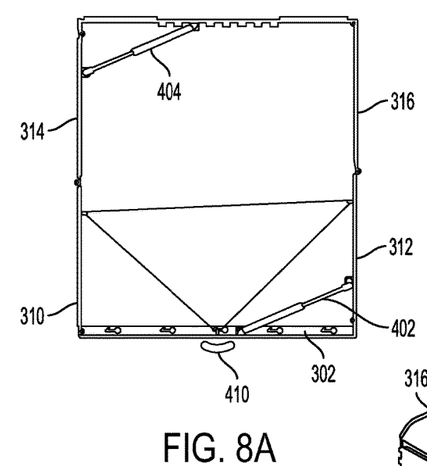
FIGS. 8A and 8B are top plan and perspective views, respectively, of the folding chair of FIG. 4 in a fully open position and with portions removed to illustrate details associated with the deployment mechanism.
Figure 8B:
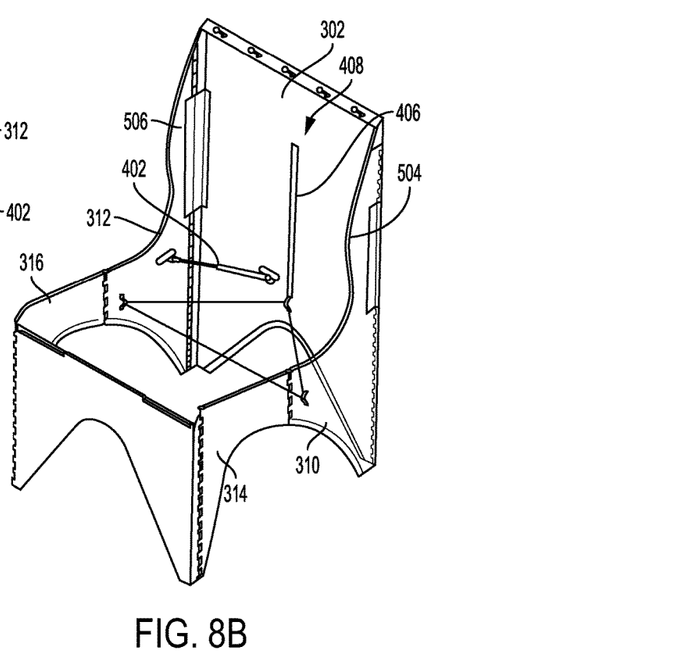
Figure 9A:
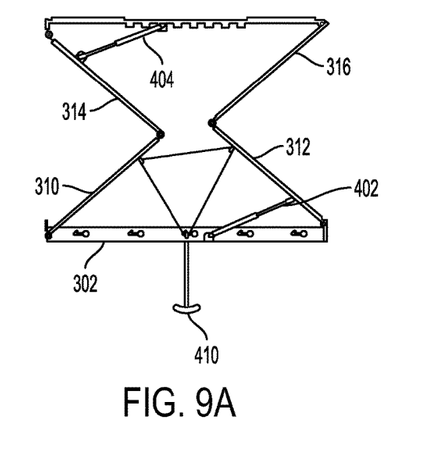
FIGS. 9A and 9B are top plan and perspective views, respectively, of the folding chair of FIG. 4 in a partially collapsed position and with portions removed to illustrate details associated with the deployment mechanism.
Figure 9B:
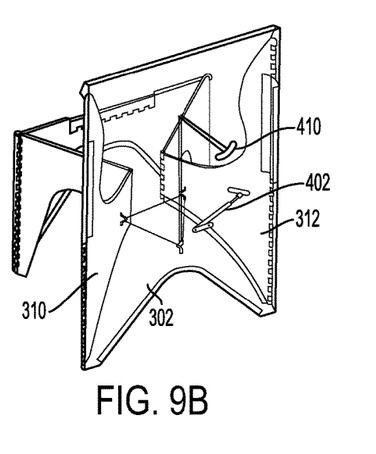

With reference to FIGS. 4-7, an alternate embodiment of a folding chair 300 is provided. Chair 300, much like chair 100, comprises several sectional pieces that are pivotally/hingedly arranged such that when in their retracted positions, chair 300 lies in a plane that is about 2 inches thick with all the planar panel pieces extending in substantially parallel planes to one another as illustrated in FIG. 7. A rigid back frame piece 302 includes hand holds 304 and several hooks/attachment mechanisms that will be described in greater detail hereinafter to which a tambour/seat covering 305 can be removably attached. A pair of side frames, designated generally by reference numerals 306 and 308, each includes a rear side frame 310, 312, respectively, and a front side frame 314, 316, respectively. Rear side frames 310, 312 are each pivotally/hingedly attached to back frame piece 302 along axes that are parallel to vertically extending axis A-A. Front side frames 314, 316 are pivotally/hingedly attached rear side frames 310, 312, respectively. A front frame piece 318 is pivotally/hingedly connected between the leading edges of front side frames 314, 316. A seat frame, designated generally by reference numeral 320, comprises a rear seat frame 322 pivotally/hingedly connected to a front seat frame 324 about an axis B-B that extends transverse to axis A-A. Rear seat frame 322 is pivotally/hingedly connected at its trailing edge to back frame piece 302 along an axis C-C that is parallel to axis B-B, and front seat frame 324 is pivotally/hingedly connected at its leading edge along an axis that is parallel to axis B-B.

Figure 4:
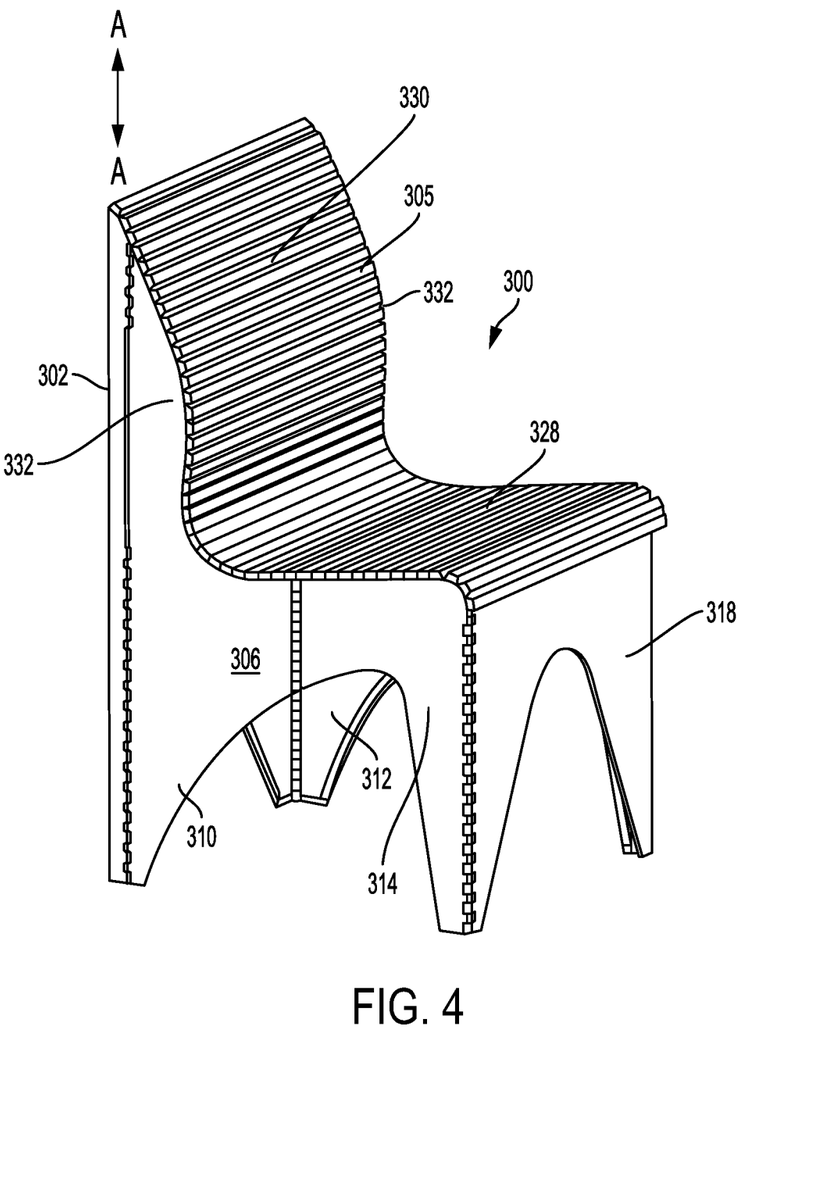
FIG. 4 is a perspective view of a folding chair in its fully open position in accordance with an alternate embodiment of the present invention.
Figure 5:
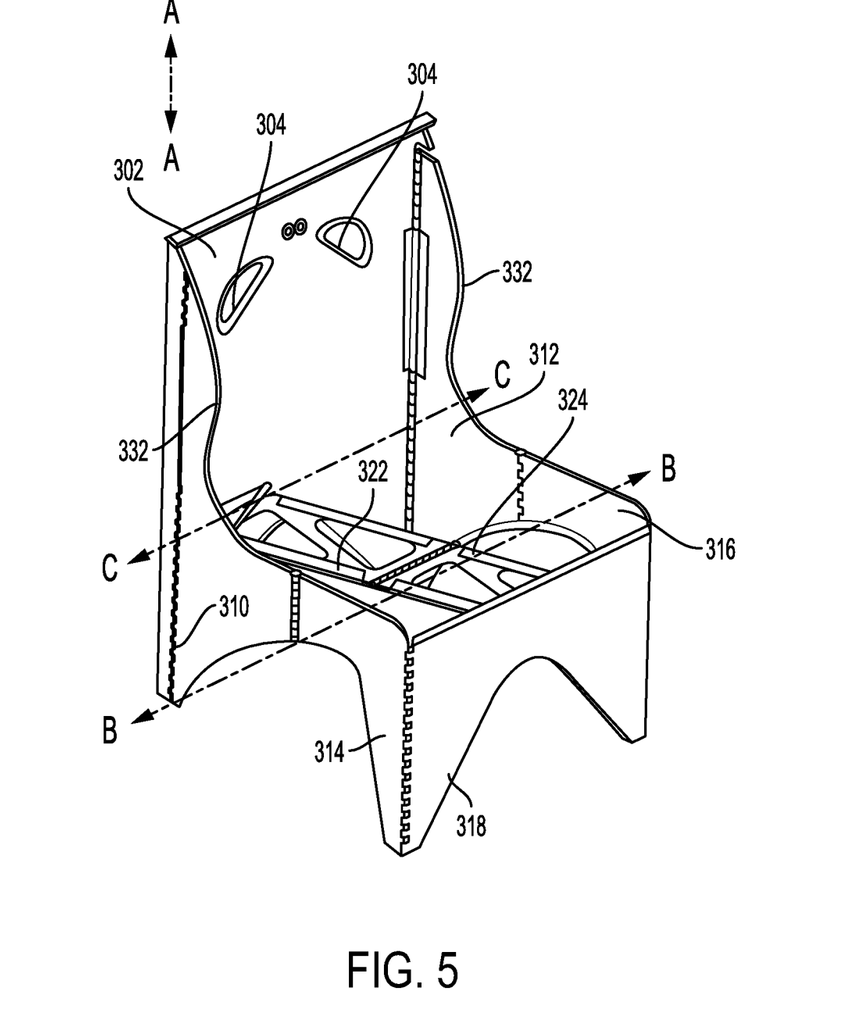
FIG. 5 is a perspective view of the frame for the folding chair of FIG. 4 in its fully open position.
Figure 6:
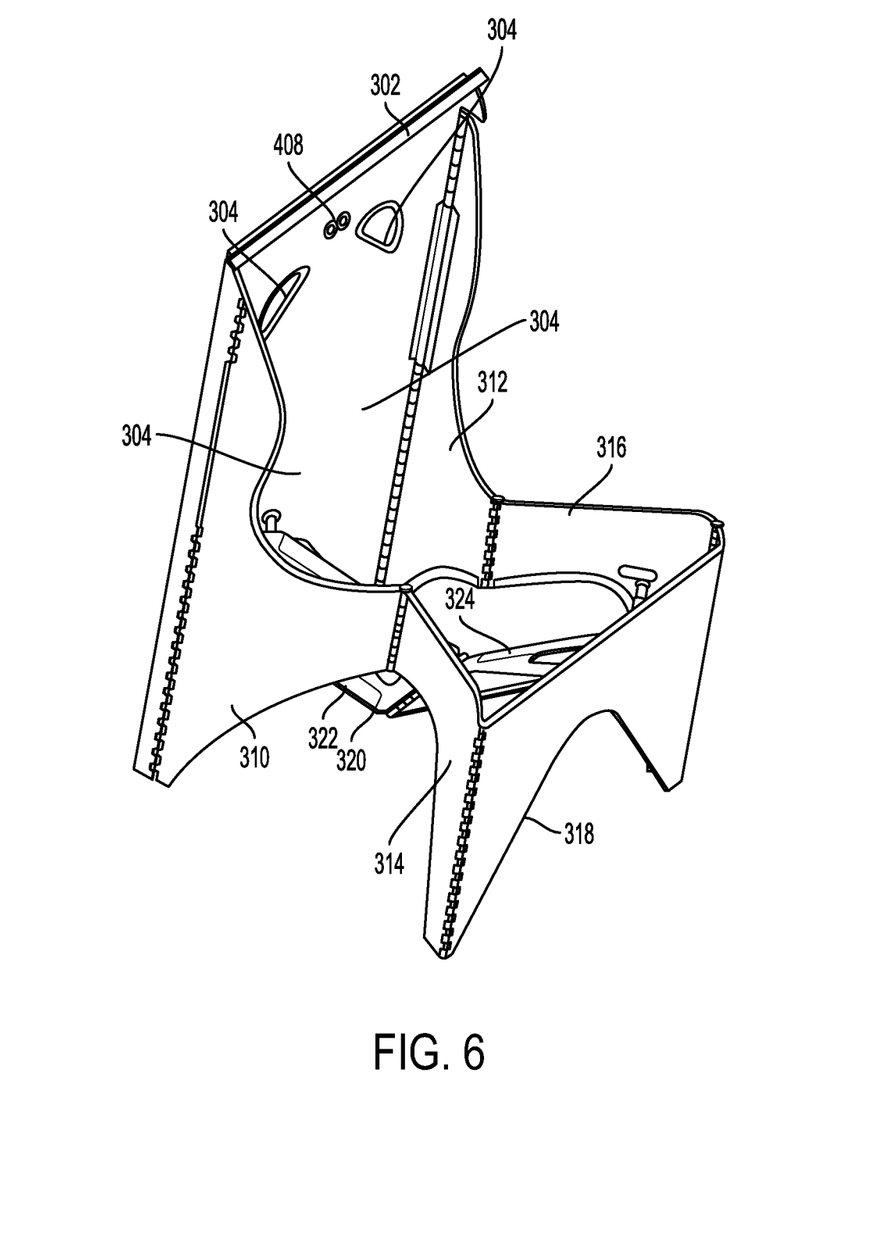
FIG. 6 is a perspective view of the frame for the folding chair of FIG. 4 in a transitional position between fully open and fully retracted.

As with seat 12 and back 14, seat 328 and back 330 are composed of tambour 305 that is draped over and attached via hooks/attachment mechanisms 304. The tambour 305 provides a material that is flexible in both directions and permits the chair to be retracted or extended without the support surfaces impeding this function. The leading edge of the side pieces' rear frame piece 310/312 and the forward edge of side pieces' front frame pieces 314/316 are ergonomically shaped such that a lumbar region 332 is formed in back 330 and seat 328 when the chair 300 is deployed.

Deployment/retraction mechanism 400 comprises a forward positioned gas piston/cylinder 402 and a rear gas piston/cylinder arrangement 404 (used primarily for deployment), and a string (or other actuator) 406 (used primarily for retraction). Forward positioned gas piston 402 extends between the interior surfaces of front side frame 314 and front frame 318, and rear positioned arrangement 404 extends between the interior surfaces of rear side frame 310 and rear frame piece 302 along axes that are parallel to one another but obliquely offset to axis B-B. To retract chair 300, a user can pull string 406 which causes the sides to pull in towards one another with the gas pistons 402/404 collapsing in a manner consistent with retraction of the chair 300 from its open position. To open chair 300, a user merely has to lift the rear of the chair slightly up off the ground (using hand holds 304) and tip it forward. The force of gravity will suffice to cause gas pistons 402/404 to actuate and push outwardly on the side frames 314, 316 causing the chair to open.

With respect to FIGS. 8A, 8B, 9A and 9B, pull string 406 is illustrated in additional detail. Pull string 406 is doubled over with both strands passing through an opening 408 formed adjacent the top of rear frame 302 and includes a handle 410 that remains exteriorly of chair 300. String 406 passes down along the rear frame 302 and through a hook 412 positioned adjacent the bottom of rear frame 302. Each strand of string 402 then extend in diagonally opposite directions before passing through hooks 414 formed on the interior of rear side frame 310, 312. Thus, when a user pulls on handle 410, the rear side frames 310, 312 will be forcibly moved inwardly towards one another collapsing chair 300 with the further aid of gas pistons 402/404.

Figure 10A:
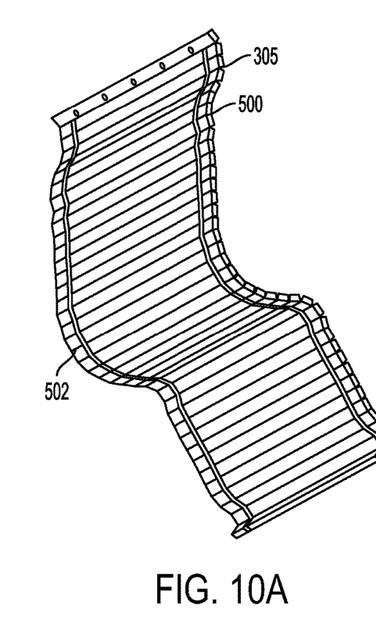
FIG. 10A is a perspective view of a tambour in accordance with an aspect of the invention.
Figure 10B:
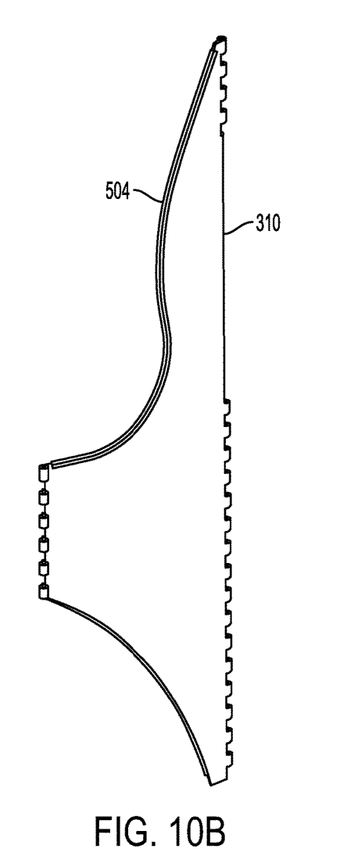
FIG. 10B is a side elevation view of a rear-side frame member in accordance with an aspect of the invention.

With regard to FIGS. 10A-10B, a detail of the attachment of tambour 305 to frame 310/312 is provided. Tambour 305 includes a pair of receiver rails 500, 502 fastened to its back surface that extends along its lateral edges. These rails 500, 502 are preferably composed of rubber or other resilient material and are adapted to securely engage flanges 504, 506, respectively, formed along the edges of rear side frames 310, 312, respectively (only rear side frame 310 shown in FIG. 10B.) In addition, the top piece of tambour 305 includes a series of holes formed therethrough for purposes of passing fasteners to attach the tambour to the rear frame 302.

Figure 11A:
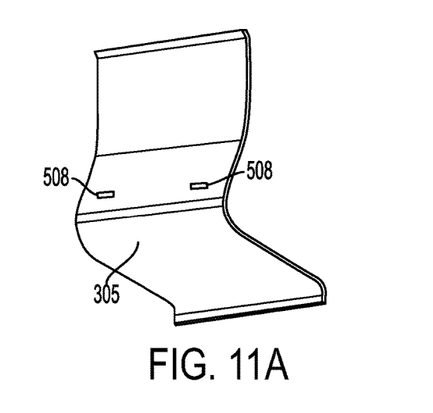
FIG. 11A is a perspective view of the rear side of a tambour in accordance with an aspect of the invention.
Figure 11B:
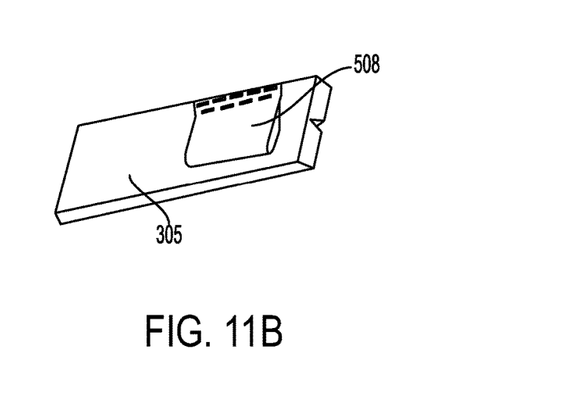
FIG. 11B is an enlarged perspective of a portion of the rear side of the tambour of FIG. 11A.
Figure 11C:
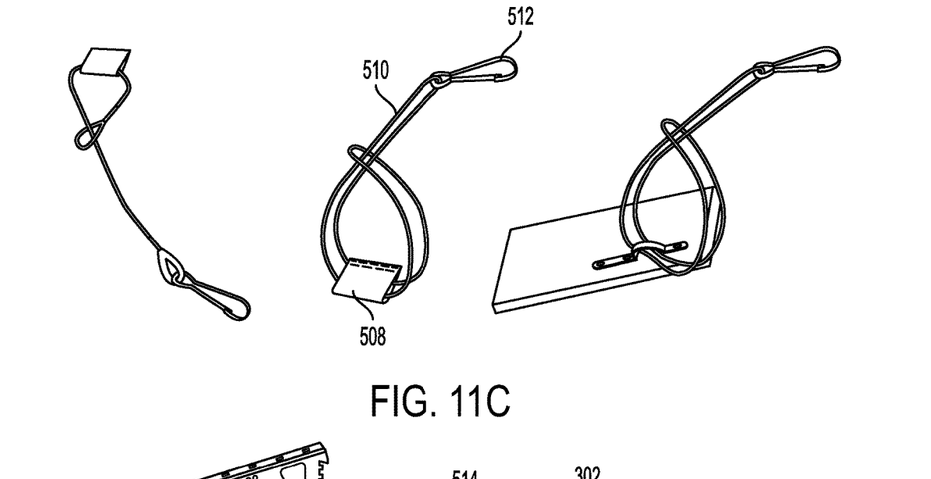
FIG. 11C is a perspective view of a bungee attachment cord used in association with the tambour of FIG. 11A in accordance with an aspect of the invention.
Figures 11D, 11E:
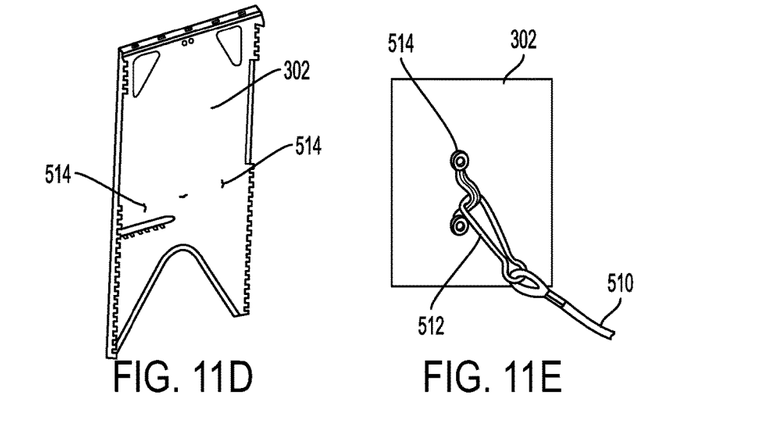
FIG. 11D is a perspective view of the rear frame member of a chair made in accordance with the present invention.
FIG. 11E is an enlarged perspective view of the bungee attachment point on the rear frame member in accordance with an aspect of the invention.

With regard to FIGS. 11A-11E, a further detail of the attachment of tambour 305 is provided. Tambour 305 further comprises a loop 508 (or pair of loops 508) sewn or otherwise fastened to it interior surface as shown in FIGS. 11A and 11B. A bungee 510 is looped through loop 508 (and 510) (preferably double looped), and includes a snap hook 512 on its free end as shown in FIG. 11C. Snap hooks 512, in turn, snaps and securely engage with a hooks 514 formed on the interior of rear seat frame 302, further reinforcing the removable attachment of tambour 305 to chair 300.

While the preferred embodiment of the present invention relates to a folding chair, the same design constraints can be parametrically or otherwise modified to make different configurations such barstools, ottomans, chaise lounges, etc.

What is claimed is:

1. A folding furniture piece, comprising:
   a. a frame, comprising a back frame piece having a width, first and second side frame pieces spaced from one another by the width of the back frame piece, wherein each side frame piece further comprises a front-side frame piece and a rear-side frame piece hingedly connected to one another, a front frame piece that extends between and is hingedly connected to said front-side frame pieces, and a seat frame;
   b. a deployment mechanism comprising a first piston and cylinder arrangement that moves said frame between fully retracted and fully extended positions; and
   c. a support structure covering said back frame piece and said seat frame piece.

2. The folding furniture piece according to claim 1, wherein said deployment mechanism comprises a user accessible string operably connected to said first piston and cylinder arrangement.

3. The folding furniture piece according to claim 1, wherein said first piston and cylinder arrangement extends between said rear-side frame pieces of said first and second side frame pieces and along a longitudinal axis.

4. The folding furniture piece according to claim 1, wherein said first piston and cylinder arrangement extends between one of said rear-side frame pieces and said back frame piece and along a longitudinal axis.

5. The folding furniture piece according to claim 4, wherein said deployment mechanism comprises a second piston and cylinder arrangement that extends between one of said front-side frame pieces and said front frame piece.

6. The folding furniture piece according to claim 1, wherein said support structure is a tambour.

7. The folding furniture piece according to claim 6, wherein said tambour comprises an attachment mechanism that permits removable attachment to said back frame piece.

8. The folding furniture piece according to claim 1, wherein each of said rear-side frame pieces comprises an ergonomically shaped leading edge.

9. The folding furniture piece according to claim 1, wherein said seat frame comprises a front seat frame piece and a rear seat frame piece hingedly connected to one another, said rear seat frame piece also hingedly connected to said back frame piece and said front frame piece hingedly connected to said front frame piece.

10. A folding furniture piece, comprising:
    a. a frame, comprising a planar back frame piece having a width, planar first and second side frame pieces spaced from one another by the width of the back frame piece, wherein each side frame piece further comprises a planar front-side frame piece and a planar rear-side frame piece hingedly connected to one another, a front frame piece that extends between and is hingedly connected to said front-side frame pieces, and a seat frame;
    b. a deployment mechanism comprising a first piston and cylinder arrangement that moves said frame between fully retracted and fully extended positions; and
    c. wherein when said deployment mechanism is in said fully retracted position, each of said planar back frame piece, said planar first and second side frame pieces, said planar front-side frame piece and a planar rear-side frame piece, said front frame piece, and said seat frame all extend in planes that are substantially parallel to one another.

11. The folding furniture piece according to claim 10, further comprising a support structure covering said back frame piece and said seat frame piece.

12. The folding furniture piece according to claim 11, wherein said support structure is a tambour.

13. The folding furniture piece according to claim 12, wherein said tambour comprises an attachment mechanism that permits it to be removably attached to said back frame piece.

14. The folding furniture piece according to claim 10, wherein each of said rear-side frame pieces comprises an ergonomically shaped leading edge.

15. The folding furniture piece according to claim 10, wherein said seat frame comprises a front seat frame piece and a rear seat frame piece hingedly connected to one another, said rear seat frame piece also hingedly connected to said back frame piece and said front frame piece hingedly connected to said front frame piece.

16. The folding furniture piece according to claim 10, wherein said deployment mechanism comprises a user accessible string operably connected to said first piston and cylinder arrangement.

17. The folding furniture piece according to claim 10, wherein said first piston and cylinder arrangement extends between said rear-side frame pieces of said first and second side frame pieces and along a longitudinal axis.

18. The folding furniture piece according to claim 10, wherein said first piston and cylinder arrangement extends between one of said rear-side frame pieces and said back frame piece and along a longitudinal axis.

\* \* \* \* \*